United States Patent
Endo et al.

(10) Patent No.: US 7,120,745 B2
(45) Date of Patent: Oct. 10, 2006

(54) CACHE MEMORY DEVICE AND MEMORY ALLOCATION METHOD

(75) Inventors: Kumiko Endo, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 10/337,430

(22) Filed: Jan. 7, 2003

(65) Prior Publication Data

US 2004/0006669 A1    Jan. 8, 2004

(30) Foreign Application Priority Data

Jul. 5, 2002    (JP) .............................. 2002-197953

(51) Int. Cl.
*G06F 12/00*    (2006.01)
*G06F 13/00*    (2006.01)

(52) U.S. Cl. .................... 711/128; 711/154; 711/170

(58) Field of Classification Search ........... 711/128, 711/170–173, 100, 118
See application file for complete search history.

(56) References Cited

U.S. PATENT DOCUMENTS

| | | | |
|---|---|---|---|
| 5,301,296 A | 4/1994 | Mohri et al. | |
| 5,367,653 A | 11/1994 | Coyle et al. | |
| 5,761,715 A | 6/1998 | Takahashi | |
| 5,787,490 A | 7/1998 | Ozawa | |
| 6,148,140 A * | 11/2000 | Okada et al. ............... | 386/105 |
| 6,330,392 B1 * | 12/2001 | Nakatani et al. .............. | 386/52 |
| 6,449,694 B1 * | 9/2002 | Burgess et al. ............. | 711/128 |
| 6,530,037 B1 * | 3/2003 | Ando et al. .................... | 714/8 |
| 7,023,825 B1 * | 4/2006 | Haumont et al. ........... | 370/338 |

FOREIGN PATENT DOCUMENTS

| | | |
|---|---|---|
| JP | SHO 62-194562 A | 8/1987 |
| JP | HEI 2-293946 A | 12/1990 |
| JP | HEI 4-217051 A | 8/1992 |
| JP | HEI 5-120133 A | 5/1993 |
| JP | HEI 5-241962 A | 9/1993 |
| JP | HEI 6-161896 A | 6/1994 |
| JP | HEI 9-50401 A | 2/1997 |
| JP | HEI 9-101916 A | 4/1997 |
| JP | 2000-20396 A | 1/2000 |

* cited by examiner

*Primary Examiner*—Tuan Van Thai
(74) *Attorney, Agent, or Firm*—Staas & Halsey LLP

(57) ABSTRACT

A cache memory device comprises a secondary tag RAM that partially constitutes a secondary cache memory and employs a set associative scheme having a plurality of ways, and a secondary cache access controller that, when the number of ways in the secondary tag RAM is changed, allocates tags to respective entries so that the total number of entries constituting the secondary tag RAM and the total number of entries after the number of ways is changed are constant.

2 Claims, 10 Drawing Sheets

40a:SECONDARY TAG RAM

FIG.4

| RAM# | 4 WAYS <18:17> | | WAY ALLOCATION | 2 WAYS <19:17> | | WAY ALLOCATION |
|---|---|---|---|---|---|---|
| | Even | Odd | | Even | Odd | |
| 0 | 00 | 10 | WAY0 | 010 | 000 | WAY0 |
| 1 | 10 | 00 | WAY2 | 100 | 110 | WAY0 |
| 2 | 01 | 11 | WAY0 | 011 | 001 | WAY0 |
| 3 | 11 | 01 | WAY2 | 101 | 111 | WAY0 |
| 4 | 00 | 10 | WAY1 | 010 | 000 | WAY1 |
| 5 | 10 | 00 | WAY3 | 100 | 110 | WAY1 |
| 6 | 01 | 11 | WAY1 | 011 | 001 | WAY1 |
| 7 | 11 | 01 | WAY3 | 101 | 111 | WAY1 |

| INDEX | WAY0 | | WAY1 | | WAY2 | | WAY4 | |
|---|---|---|---|---|---|---|---|---|
| | 14 | | | | | | | |
| 00 | TAG | DATA | TAG | DATA | TAG | DATA | TAG | DATA |
| 01 | TAG | DATA | TAG | DATA | TAG | DATA | TAG | DATA |
| 10 | TAG | DATA | TAG | DATA | TAG | DATA | TAG | DATA |
| 11 | TAG | DATA | TAG | DATA | TAG | DATA | TAG | DATA |

| INDEX | WAY0 | | WAY1 | | WAY2 | | WAY4 | |
|---|---|---|---|---|---|---|---|---|
| | 14 | | | | | | | |
| 00 | TAG | DATA | TAG | DATA | TAG | DATA | TAG | DATA |
| 01 | TAG | DATA | TAG | DATA | TAG | DATA | TAG | DATA |
| 10 | TAG | DATA | TAG | DATA | TAG | DATA | TAG | DATA |
| 11 | TAG | DATA | TAG | DATA | TAG | DATA | TAG | DATA |

CACHE MEMORY DEVICE AND MEMORY ALLOCATION METHOD

BACKGROUND OF THE INVENTION

1) Field of the Invention

The present invention relates to a cache memory device having an n-way set-associative cache memory and to a memory allocation method. More particularly, the invention relates to a cache memory device and a memory allocation method capable of uniquely specifying a way in which an error occurs and changing the number of ways without degrading performance of the device.

2) Description of the Related Art

FIG. 7 is a block diagram showing the configuration of a conventional cache memory device. The cache memory device shown in FIG. 7 comprises a multiple cache memory (a primary cache memory 12 and a secondary cache memory 14) to compensate for a difference in speed between a central processing unit (CPU) 10 and a main memory 15.

The CPU 10 accesses the primary cache memory 12, the secondary cache memory 14, or the main memory 15 to read/write data.

The main memory 15 has such characteristics that the main memory 15 has a large capacity and an access time is longer than that of the primary cache memory 12 and the secondary cache memory 14. The main memory 15 stores all data used in the CPU 10.

The primary cache memory 12 and the secondary cache memory 14 are, for example, static random access memories (SRAMs), and have such characteristics that an access time is shorter than that of the main memory 15.

The primary cache memory 12 has such a characteristic that the primary cache memory 12 has an access time shorter than that of the secondary cache memory 14. More specifically, of the primary cache memory 12, the secondary cache memory 14, and the main memory 15, the primary cache memory 12 has the shortest access time, the secondary cache memory 14 has the second shortest access time, and the main memory 15 has the longest access time.

In addition, in consideration of a storage capacity, the main memory 15 has the largest storage capacity, the secondary cache memory 14 has the second largest storage capacity, and the primary cache memory 12 has the smallest storage capacity.

In this case, data transfer between the CPU and the cache memory (main memory) is performed in units of lines. Some schemes that correlate data on the main memory with the lines in the cache memory are known.

As a typical scheme, there is a set associative scheme. This scheme divides a main memory and a cache memory into a plurality of sets (sets of lines: which are called ways), and allows data on the main memory to be placed only on a predetermined line in the respective ways.

The set associative scheme is referred to as a direct mapping scheme (or a one-way set associative scheme) when a cache memory is handled as one way, and is referred to as an n-way set associative scheme when N ways are used.

FIG. 8 is a diagram for explaining the correspondence between the main memory 15 and the secondary cache memory 14 with respect to the direct mapping scheme. In FIG. 8, 5-bit addresses and data are (data 0 to 4, . . . ) are stored in the main memory 15 so that each of the addresses is paired with each of the data.

The secondary cache memory 14, as shown in FIG. 7, comprises a secondary tag RAM 14a and a secondary data RAM 14b. In the secondary cache memory 14, the lower two bits of each address stored in the main memory 15 are stored as an index in an "index".

The upper three bits of each address stored in the main memory 15 are stored as a tag in a "tag". These "index" and "tag" are stored in the secondary tag RAM 14a (see FIG. 7).

On the other hand, data stored in the main memory 15 are stored in "data". The "data" is stored in the secondary data RAM 14b.

In contrast to this, FIG. 9 is a diagram for explaining the n-way set associative scheme in the secondary cache memory 14. In FIG. 9, the secondary cache memory 14 is divided into n WAYs and managed, and the WAYs of the secondary tag RAM 14a (see FIG. 7) and the WAYs of the secondary data RAM 14b have one-to-one correspondence.

In FIG. 9, in the same manner as that in FIG. 8, the upper three bits of each address stored in the main memory 15 are stored as a tag in the "tag" of the secondary cache memory 14. These "index" and "tag" are stored in the secondary tag RAM 14a (see FIG. 7).

On the other hand, data stored in the main memory 15 are stored in the "data". The "data" is stored in the secondary data RAM 14b. In the following description, it is assumed that the secondary cache memory 14 is an n-way (4-way) set associative cache memory.

Returning to FIG. 7, the primary cache memory 12 stores some of the data stored in the main memory 15, and is a an n-way set associative memory. This primary cache memory 12 comprises a primary tag RAM 12a and a primary data RAM 12b.

In a conventional cache memory device, each of a primary cache access controller 11 and a secondary cache access controller 13 has a function of correcting error data into correct data by using tag management data 20 shown in FIG. 10.

The tag management data 20 is stored in the primary tag RAM 12a or the secondary tag RAM 14a, and comprises a tag 21, a tag 22, and an error checking code (ECC) 23.

The tag 21 corresponds to a WAY m. The tag 22 corresponds to a WAY n different from the WAY m of the tag 21.

The ECC 23 is redundant data added to the tag 21 and the tag 22. The ECC 23 is an error correction code used to correct error data into correct data when an error occurs in any one of the tag 21 and the tag 22.

In the conventional cache memory device, there is a case, for example, where the secondary cache memory 14 of the 4-way set associative scheme shown in FIG. 11A may be changed into a secondary cache memory of a 2-way set associative scheme, i.e., the number of ways may be changed with a change in design or a change in specification.

In this case, as shown in FIG. 11B, the following changing method is employed. That is, the functions of WAY 2 and WAY 4 are stopped (e.g., tags and data are deleted), and only WAY 0 and WAY 1 are functioned.

As described above, the conventional cache memory device uses the tag management data 20 that shares one ECC 23 for the tag 21 (WAY m) and the tag 22 (WAY n) of different ways, as shown in FIG. 10. Therefore, when an error has occurred, it is understood only that the error has occurred in either one of the WAY m and the WAY n. Therefore, the way in which the error has occurred cannot be uniquely specified.

Further, in the conventional cache memory device, as shown in FIG. 11B, the functions of WAY 2 and WAY 4 are simply stopped to update the number of ways. Therefore, the cache capacity of the secondary cache memory 14 becomes half, and the performance is degraded.

SUMMARY OF THE INVENTION

It is an object of the present invention to provide a cache memory device and a memory allocation method capable of specifying a way in which an error occurs and changing the number of ways without degrading the performance.

The cache memory device according to one aspect of this invention, comprises a cache memory that employs a set associative scheme having a plurality of ways, and an allocation unit that, when a number of ways is changed, allocates tags to respective entries so that a total number of entries constituting the cache memory and a total number of entries obtained after the number of ways is changed are constant.

The memory allocation method according to another aspect of this invention, is applied to a cache memory device with a cache memory that employs a set associative scheme having a plurality of ways. The memory allocation method comprises a step of allocating tags to respective entries so that a total number of entries constituting the cache memory and a total number of entries obtained after the number of ways is changed are constant, when the number of ways is changed.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a diagram showing an allocation table 50 corresponding to the secondary tag RAM 40a shown in FIG. 2.

DETAILED DESCRIPTIONS

An embodiment of the cache memory device and the memory allocation method according to the present invention will be described below with reference to the accompanying drawings.

Figure 1:
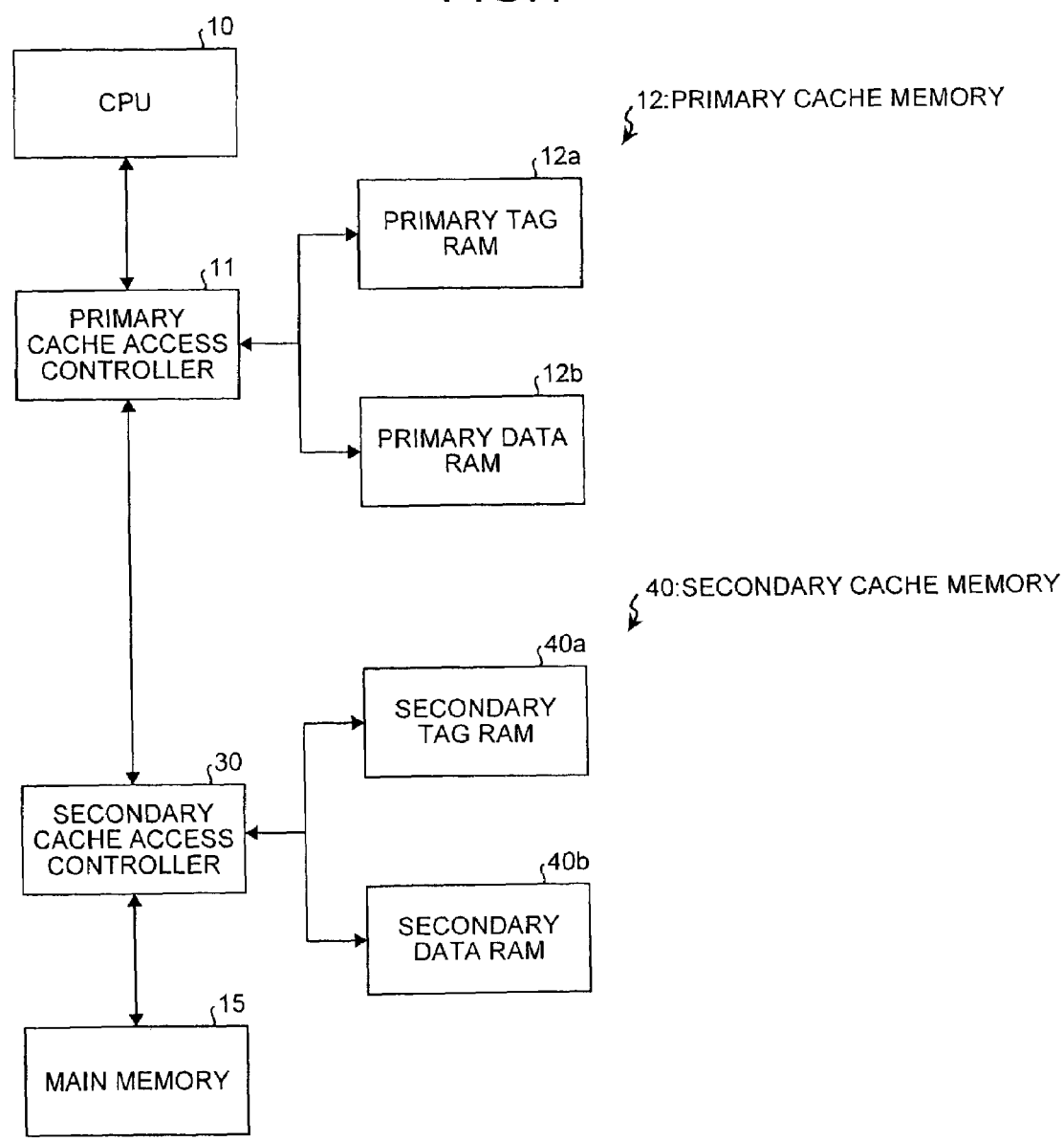
FIG. 1 is a block diagram showing the configuration of an embodiment of the present invention.

FIG. 1 is a block diagram showing the configuration of the embodiment of the present invention. FIG. 1 shows the cache memory device comprising a multiple cache memory (a primary cache memory 12 and a secondary cache memory 40).

Figure 7:
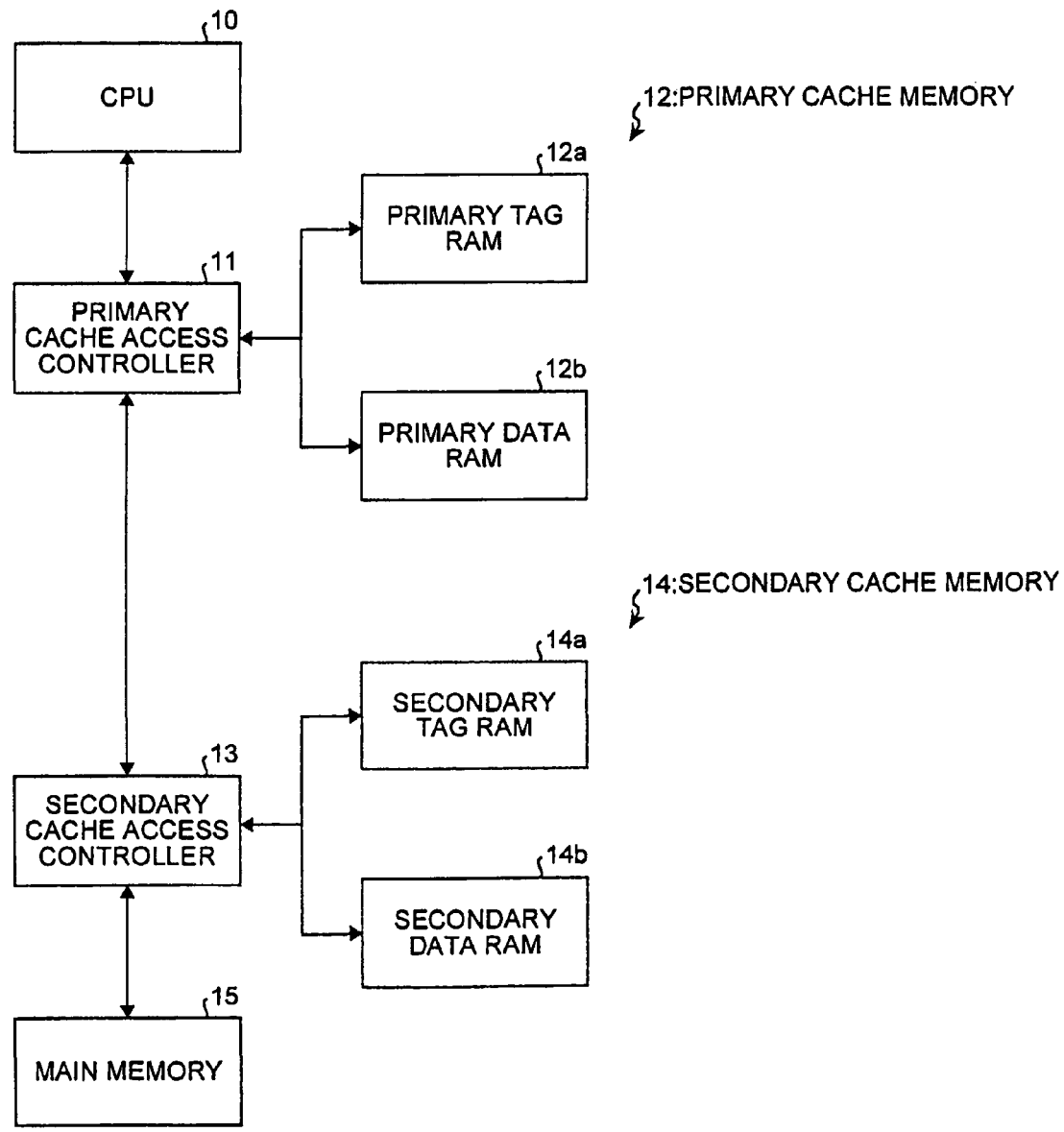
FIG. 7 is a block diagram showing the configuration of a conventional cache memory device.
Figure 8:
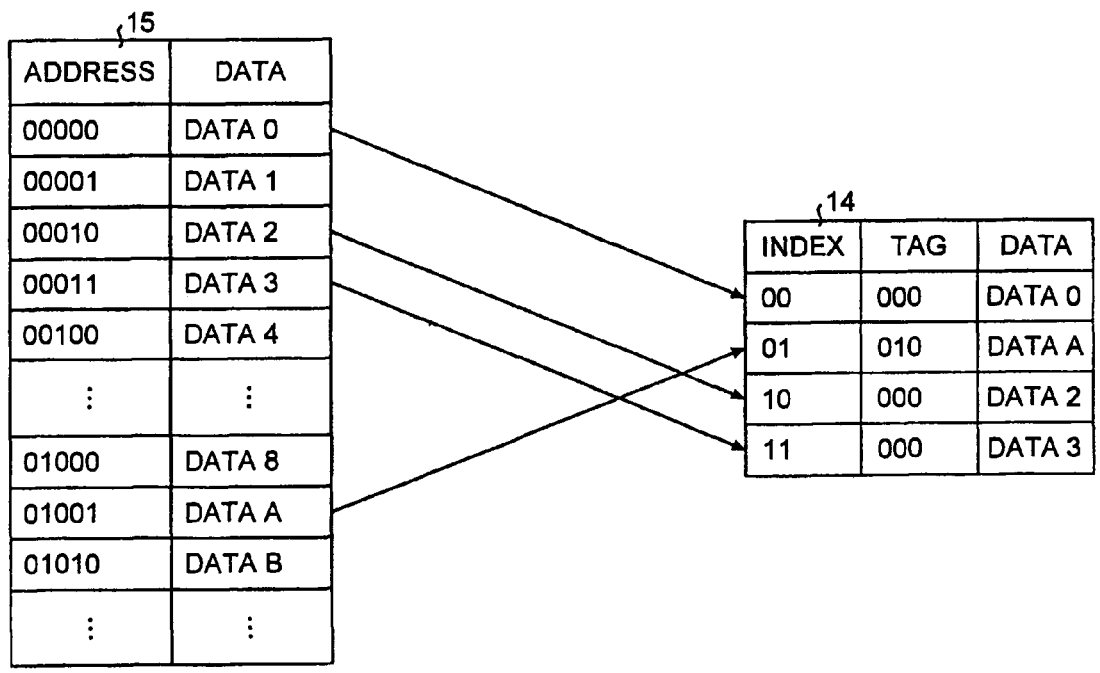
FIG. 8 is a diagram for explaining the correspondence between the main memory 15 and the secondary cache memory 14 shown in FIG. 7.
Figure 9:
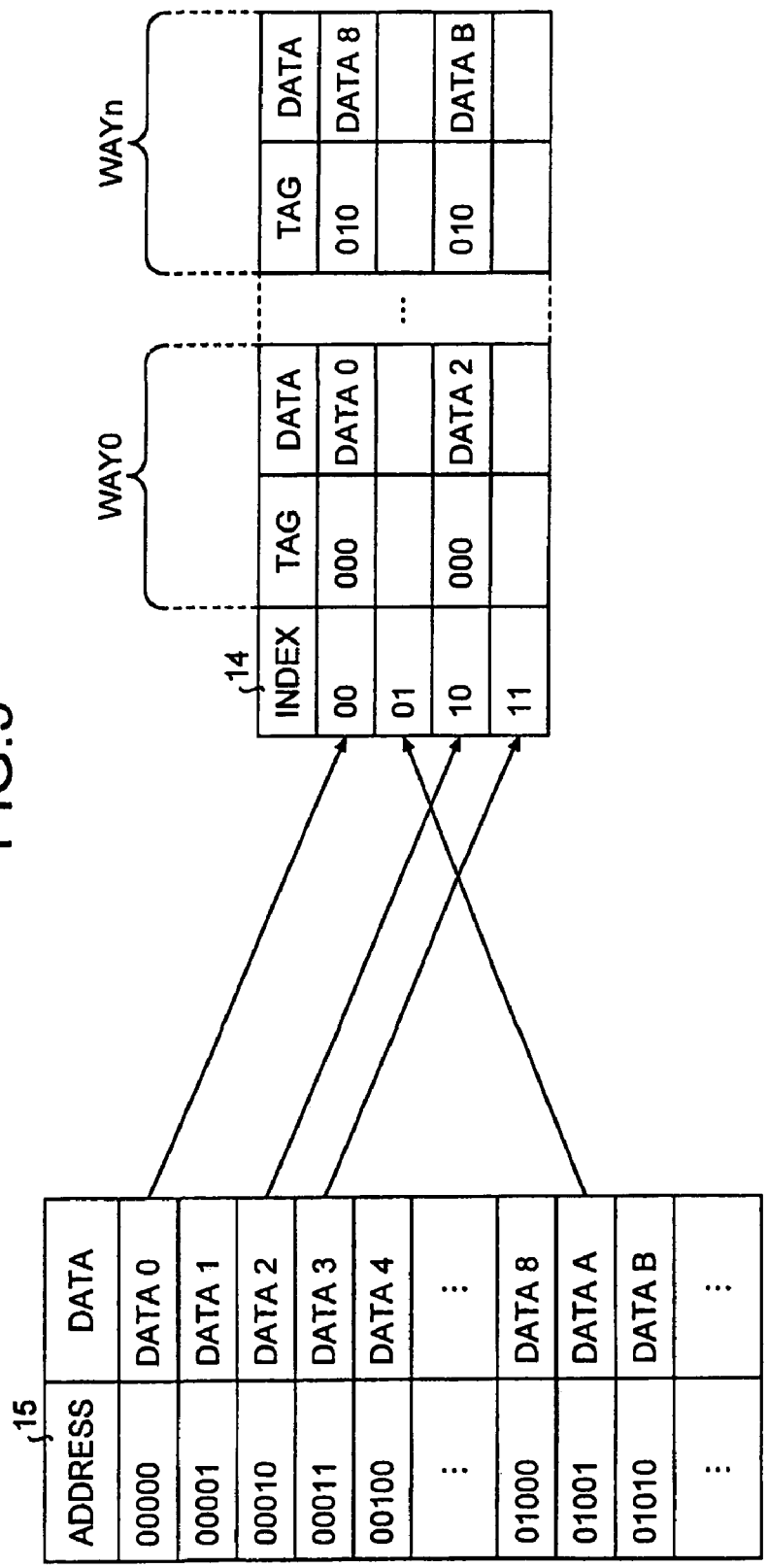
FIG. 9 is a diagram for explaining an n-way set associative scheme in the secondary cache memory 14 shown in FIG. 7.

The same reference numerals are assigned to sections in FIG. 1 corresponding to those in FIG. 7, and a description thereof will be omitted. In FIG. 1, in place of the secondary cache access controller 13 and the secondary cache memory 14 shown in FIG. 7, a secondary cache access controller 30 and a secondary cache memory 40 are disposed.

The secondary cache memory 40 is a cache memory using an n-way set associative scheme, and comprises a secondary tag RAM 40a and a secondary data RAM 40b.

Figure 2:
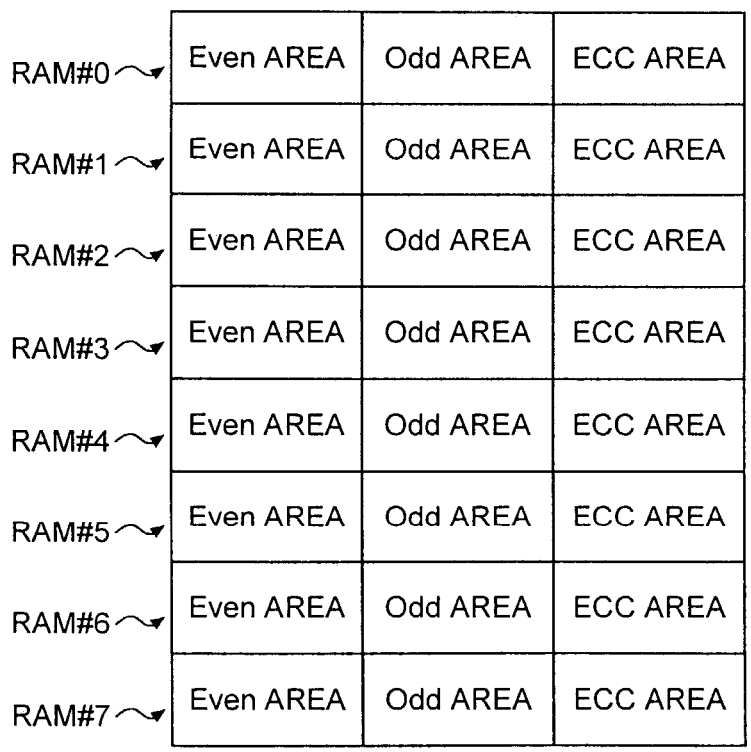
FIG. 2 is a diagram showing the configuration of a secondary tag RAM 40a shown in FIG. 1.

The secondary tag RAM 40a, as shown in FIG. 2, physically comprises eight RAMs of RAMs #0 to #7. In RAM #0, as cache areas, three areas, i.e., an Even area (upper area), an Odd area (lower area), and an ECC area are secured.

Figure 3:
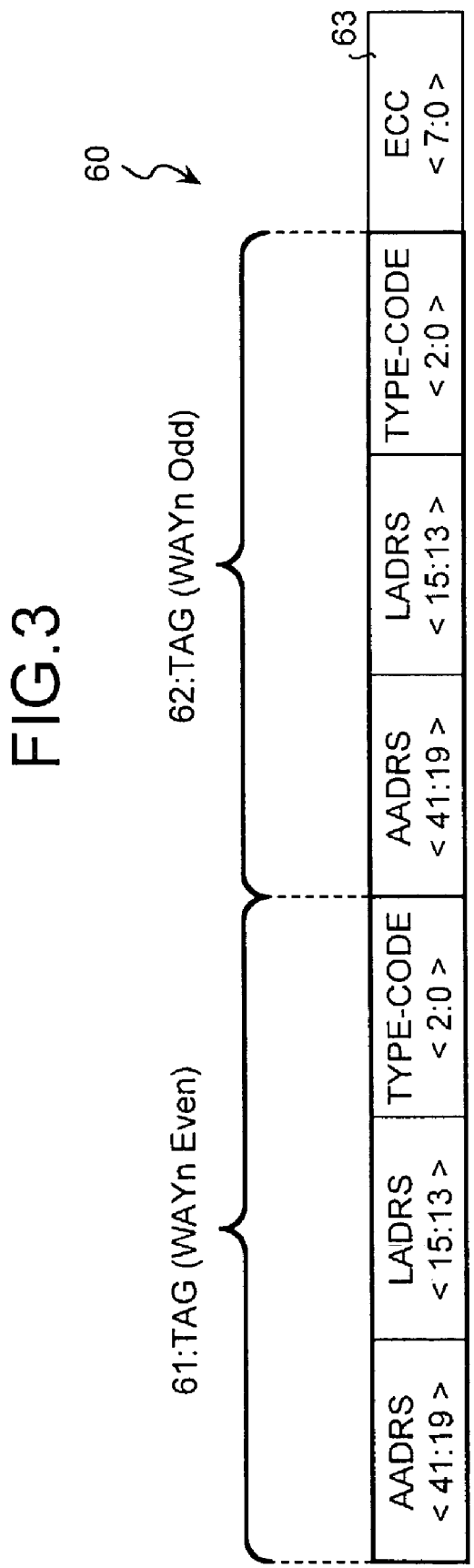
FIG. 3 is a diagram showing a format of tag management data 60 stored in the secondary tag RAM 40a shown in FIG. 2.
Figures 10, 11A, 11B:
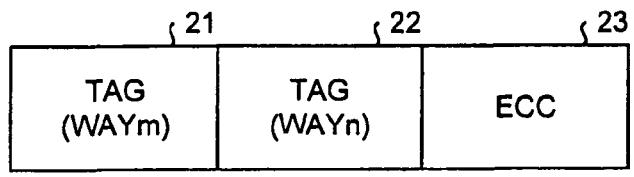
FIG. 10 is a diagram showing the data structure of tag management data 60 in the conventional cache memory device.
FIG. 11A and FIG. 11B are diagrams for explaining a method of changing the number of ways in the secondary cache memory 14 shown in FIG. 7.

RAM #0 stores the tag management data 60 shown in FIG. 3. The tag management data 60 corresponds to the tag management data 20 (see FIG. 10), and is structured with a tag 61, a tag 62, and an ECC 63.

The tag 61 and the tag 62 correspond to the same WAY n. The ECC 63 is redundant data added to the tag 61 and the tag 62. The ECC 63 is an error correction code used to correct error data into correct data when an error occurs in any one of the tag 61 and the tag 62.

Since the tag 61 and the tag 62 correspond to the same WAY n, a way is uniquely specified by the secondary cache access controller 30 when an error occurs.

The tag 61 is stored in the Even area of RAM #0 (see FIG. 2). The tag 62 is stored in the Odd area of RAM #0. The ECC 63 is stored in the ECC area of RAM #0.

In the tag 61, AADRS [41:19] denotes a tag address consisting of 19 to 41 bits, of each address stored in the main memory 15. LADRS [15:13] denotes a logical address. TYPE-CODE [2:0] denotes a code that expresses a status of the secondary cache memory 40.

Returning to FIG. 2, each of the other RAMs #1 to #7 has the same configuration as that of RAM #0. In these RAMs #1 to #7, the tag management data 60 is stored in RAMs #1 to #7, respectively.

In this embodiment, the secondary cache access controller 30 allocates tags in the secondary tag RAM 40a shown in FIG. 2 based on an allocation table 50 shown in FIG. 4.

FIG. 4 shows allocation states of the 4-way set associative scheme and the 2-way set associative scheme. The numbers (0 to 7) of RAMs #, Even and Odd correspond to the Even areas and the Odd areas of RAMs #0 to #7 shown in FIG. 2, respectively.

Figure 5:
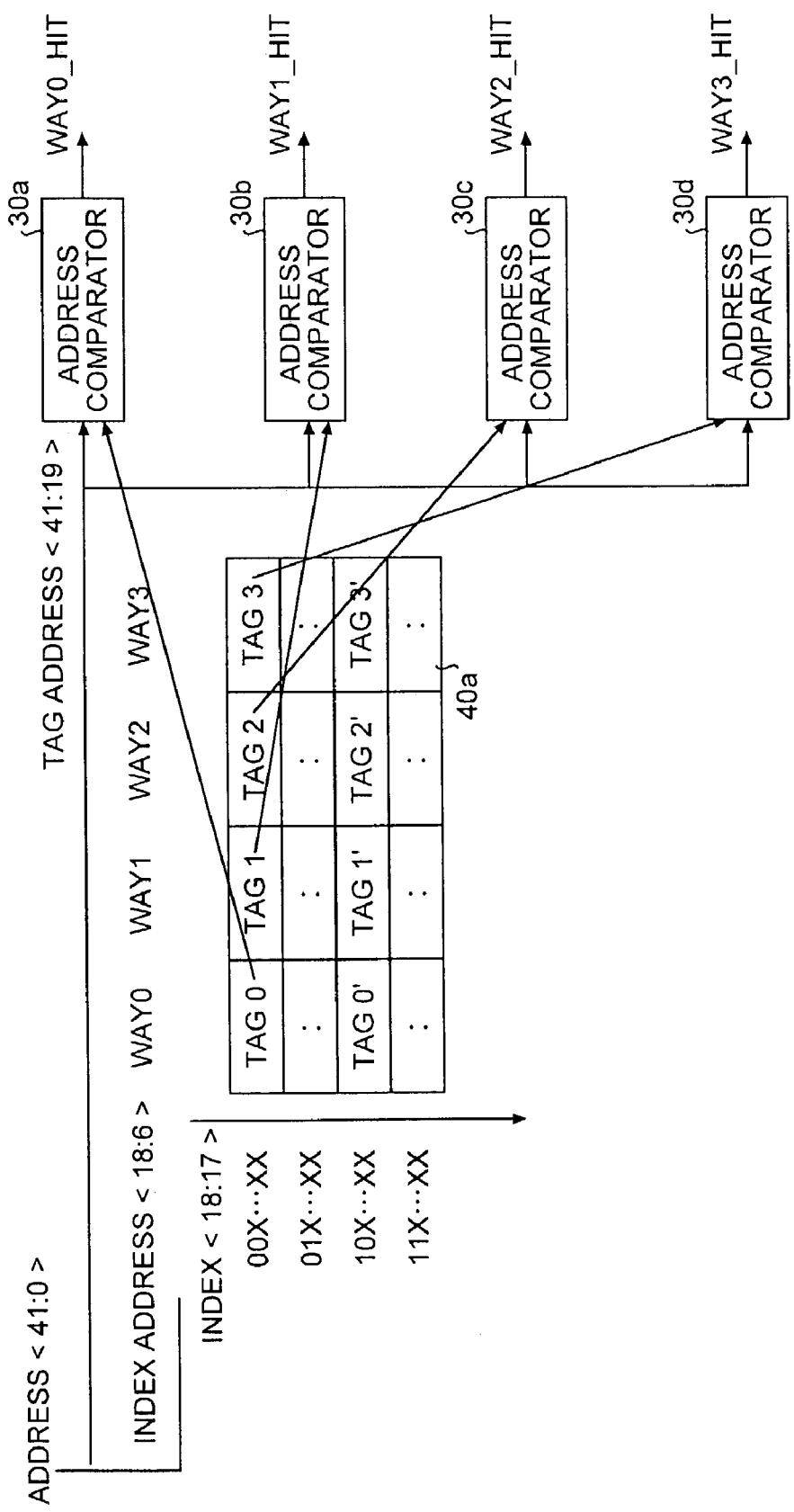
FIG. 5 is a diagram for explaining an operation in a secondary cache access controller 30 shown in FIG. 1 in a 4-way set associative scheme.
Figure 6:
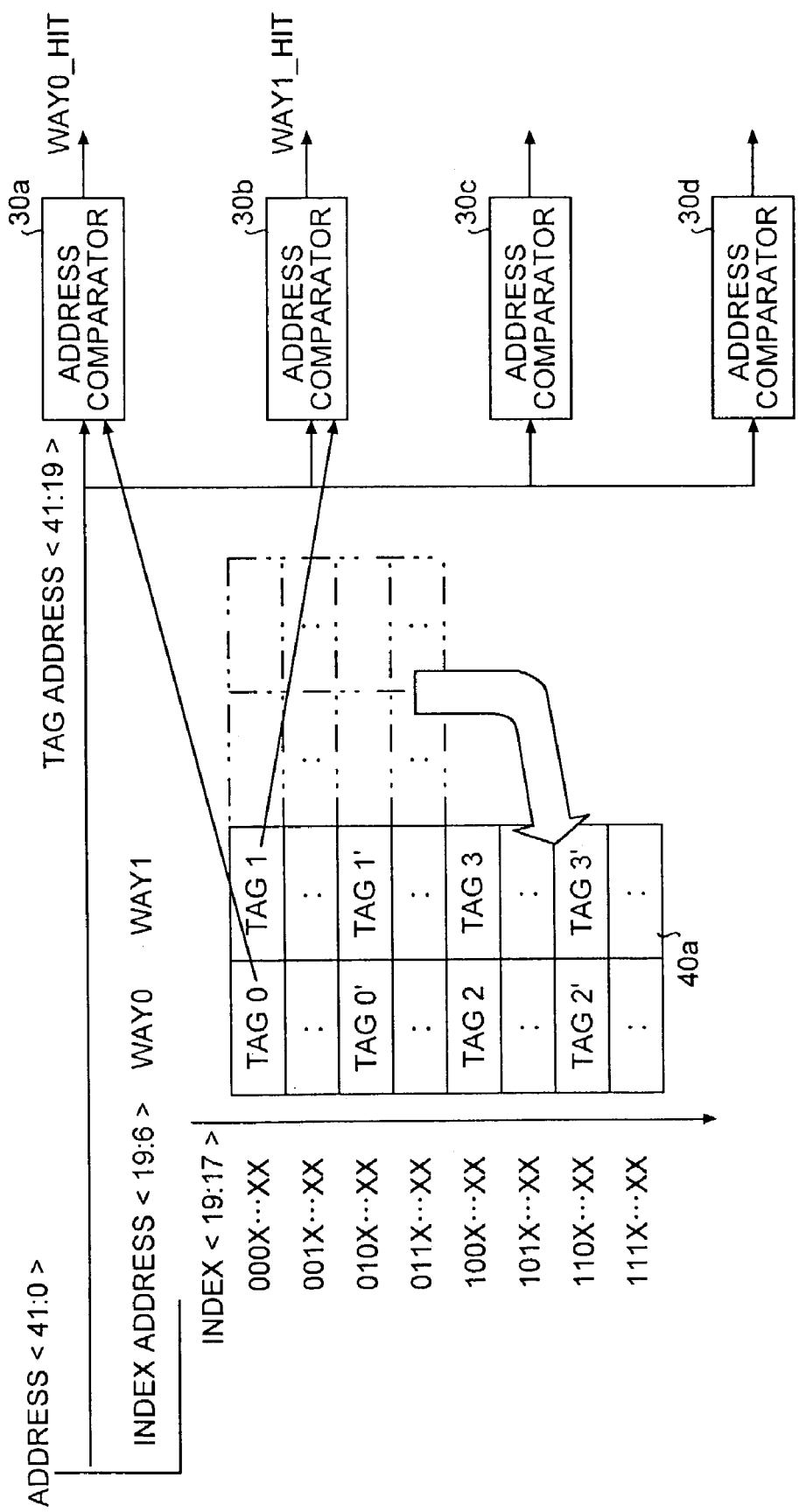
FIG. 6 is a diagram for explaining an operation in the secondary cache access controller 30 shown in FIG. 1 in a 2-way set associative scheme.

FIG. 5 shows a logical configuration of the secondary tag RAM 40a in the 4-way set associative scheme. FIG. 6 shows a logical configuration of the secondary tag RAM 40a in the 2-way set associative scheme.

In FIG. 6, a portion surrounded by a chain double-dashed line (portions corresponding to WAY 2 and WAY 3 shown in FIG. 5) is used as an additional portion of WAY 0 and WAY 1. In FIGS. 5 and 6, the capacities of the secondary tag RAMs 40a are equal to each other.

In the 4-way set associative scheme shown in FIG. 4, two bits, i.e., [18:17] as a part of the index address [18:6] included in the address [41:0] stored in the main memory 15 are used as an allocation index.

For example, in RAM #0, a tag 0 (corresponding to the tag 61: see FIG. 3) shown in FIG. 5 corresponding to allocation index 00 ("00" of 00X . . . XX: see FIG. 5) and allocated to WAY 0 (see FIG. 5) is allocated to the Even area.

In addition, in RAM #0, a tag 0' (corresponding to the tag 62: see FIG. 3) corresponding to allocation index 10 ("10" of 10X . . . XX: see FIG. 5) and allocated to WAY 0 is allocated to the Odd area.

On the other hand, in FIG. 4, in the 2-way set associative scheme, three bits, i.e., [19:17] as a part of the index address [19:6] included in the address [41:0] stored in the main memory 15 are used as an allocation index.

For example, in RAM #0 shown in FIG. 4, a tag 0' (corresponding to the tag 61: see FIG. 3) corresponding to allocation index 010 ("010" of 010X . . . XX: see FIG. 6) and allocated to WAY 0 is allocated to the Even area.

Further, in RAM #0, a tag 0 (corresponding to the tag 62: see FIG. 3) corresponding to allocation index 000 ("000" of 000X . . . XX: see FIG. 6) and allocated to WAY 0 is allocated to the Odd area.

In the allocation table 50, in order to prevent the cache capacities of the secondary tag RAMs 40a in the 4-way set associative scheme and the 2-way set associative scheme from being different from each other, allocation is set so that the multiplication result (the total number of entries in the secondary tag RAM 40a) between the number of indexes and the number of ways is constant.

More specifically, in the 4-way set associative scheme, since the index address [18:6] consists of 13 bits, the total number of entries E4 is calculated by the following equation (1).

$$E4 = 2^{\wedge}13 \times 4 \text{ ways } (\wedge \text{ is power}) \quad (1)$$

In the 2-way set associative scheme, since the index address [19:6] consists of 14 bits, the total number of entries E2 is calculated by the following equation (2).

$$E2 = 2^{\wedge}14 \times 2 \text{ ways } (\wedge \text{ is power}) = E4 \quad (2)$$

In this manner, in the 4-way set associative scheme and the 2-way set associative scheme, the number of indexes is adjusted depending on the number of ways to make the total number of entries constant. Thus, the performance can be maintained without reducing the cache capacity of the secondary tag RAM 40a.

Returning to FIG. 1, the secondary data RAM 40b stores the data of the main memory 15 in association with the tags of the secondary tag RAM 40a.

The primary cache access controller 11 and the secondary cache access controller 30, as described above, have functions that correct error data into correct data by using the ECC 63 of the tag management data 60 shown in FIG. 3.

The secondary cache access controller 30 performs access control on the secondary cache memory 40. Further, the secondary cache access controller 30 has address comparators 30a to 30d shown in FIGS. 5 and 6.

The address comparators 30a to 30d shown in FIG. 5 are arranged in association with WAY 0 to WAY 3. Each of the address comparators 30a to 30d compares a tag specified by an index and a way with a tag address [41:19] partially constituting an address. When the tag and the tag address coincide with each other, the corresponding address comparator determines that a secondary cache hit occurs (WAY 0_HIT, WAY 1_HIT). When the secondary cache hit occurs, corresponding data is read from the secondary data RAM 40b.

On the other hand, the comparators 30a and 30b shown in FIG. 6 are arranged in association with WAY 0 and WAY 1. Each of the comparators 30a and 30B compares a tag specified by an index and a way with a tag address [41:19] partially constituting an address. When the tag and the tag address coincide with each other, the corresponding comparator determines that a secondary cache hit occurs (WAY 0_HIT, WAY 1_HIT).

In the configuration, a primary cache miss occurs in the primary cache memory 12, the secondary cache access controller 30 accesses the secondary tag RAM 40a shown in FIG. 5 and specifies, e.g., the line of 00X . . . XX based on the index address [18:6] included in the address [41:0].

In this manner, the address comparator 30a compares the tag address [41:19] included in the address [41:0] with the tag 0 of WAY 0. The address comparator 30b compares the tag address [41:19] with the tag 1 of WAY 1.

The address comparator 30c compares the tag address [41:19] with the tag 2 of WAY 2. The address comparator 30d compares the tag address [41:19] with the tag 3 of WAY 3.

For example, when the tag and the tag address coincide with each other in the address comparator 30a, it is determined that a secondary cache hit occurs (WAY 0_HIT), and the secondary cache access controller 30 reads data corresponding to the tag 0 from the secondary data RAM 40b.

When the number of ways of the secondary tag RAM 40a shown in FIG. 5 is changed from 4 to 2, the secondary cache access controller 30, as shown in FIG. 6, allocates the secondary tag RAM 40a to the 2-way set associative scheme based on the allocation table 50 (see FIG. 4).

In this state, when a primary cache miss occurs in the primary cache memory 12, the secondary cache access controller 30 accesses the secondary tag RAM 40a shown in FIG. 6 to specify the line of, e.g., 000X . . . XX based on the index address [19:6] included in the address [41:0].

Accordingly, the address comparator 30a compares the tag address [41:19] included in the address [41:0] with the tag 0 of WAY 0. The address comparator 30b compares the tag address [41:19] with the tag 1 of WAY 1.

For example, when the tag and the tag address coincide with each other in the address comparator 30a, it is determined that a secondary cache hit occurs (WAY 0_HIT), and the secondary cache access controller 30 reads data corresponding to the tag 0 from the secondary data RAM 40b.

When the secondary cache access controller 30 detects an error in the tag 61 (or the tag 62) stored in RAM #0 shown in FIG. 2, the secondary cache access controller 30 uniquely specifies WAY 0 (see FIG. 4) corresponding to the tag 61 (or the tag 62) based on the allocation table 50.

As described above, according to the embodiment, as described with reference to the equations (1) and (2), the multiplication result between the number of indexes and the number of ways in the secondary tag RAM 40a is defined as the total number of entries, and the number of indexes is adjusted depending on the change of the number of ways (e.g., 4 WAYs→2 WAYs), so that tags are allocated to the respective entries based on the allocation table 50 to make the total number of entries constant. Thus, a cache capacity does not change, and the number of ways can be changed without degrading the performance.

According to the embodiment, as described with reference to FIG. 3, the common ECC 63 (error correction information) is set in association with two entries belonging to the same way is set. Thus, even though an error occurs in any one of the entries, the way in which the error occurs can be uniquely specified.

The embodiment of the present invention is described above with reference to the accompanying drawings. However, a concrete configuration is not limited to the embodiment, and changes in design and the like are included in the present invention without departing from the spirit and scope of the invention.

As described above, according to the present invention, when the number of ways is changed, tags are allocated to respective entries so that the total number of entries constituting the cache memory and the total number of entries obtained after the number of ways is changed are constant. Thus, the cache capacity does not change, and the number of ways can be advantageously changed without degrading the performance.

According to the present invention, the multiplication result between the number of indexes and the number of ways in the cache memory is defined as the total number of entries, and tags are allocated to the respective entries so that the total number of entries is made constant by adjusting the number of indexes depending on the change of the number of ways. Thus, the cache capacity does not change, and the number of ways can be advantageously changed without degrading the performance.

According to the present invention, common error correction information is set in association with a plurality of entries belonging to the same way. Thus, even though an error occurs in any one of the entries, the way in which the error occurs can be uniquely specified advantageously.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cache memory device comprising:
   a cache memory that includes a plurality of first memories for storing tags and a second memory for storing data, and employs a set associative scheme having a plurality of ways, the first memories being logically configured in columns and rows, a number of the columns corresponding to a number of the ways, each of the first memories having an entry for storing an allocated tag and an area for storing error correction information; and
   an allocation unit that, when a number of ways is changed, multiplies a number of indexes in the cache memory by the number of ways to obtain a result of multiplication, defines the result as the total number of entries, and allocates the tags to the respective entries so that the total number of entries is made constant by adjusting the number of indexes depending on the change of the number of ways, wherein
   logical configuration of the first memories is changed so as to have columns corresponding to the number of the ways changed, keeping a total number of the first memories constant.

2. A memory allocation method applied to a cache memory device with a cache memory that includes a plurality of first memories for storing tags and a second memory for storing data, and employs a set associative scheme having a plurality of ways, each of the first memories having an entry for storing allocated tags and an area for storing error correction information, the memory allocation method comprising the steps of:
   logically configuring the first memories in columns and rows, a number of the columns corresponding to the number of the ways;
   allocating tags to respective entries in the first memories so that a total number of entries is made constant by multiplying a number of indexes in the cache memory by the number of ways to obtain a result of multiplication, defining the result as the total number of the entries, and adjusting the number of indexes depending on the change of the number of ways; and
   changing logical configuration of the first memories so as to have columns corresponding to the number of the ways changed, keeping a total number of the first memories constant, when a number of ways is changed, so that a total number of entries constituting the cache memory and a total number of entries obtained after the number of ways is changed are constant.

* * * * *